United States Patent
Stairs et al.

(10) Patent No.: US 9,292,454 B2
(45) Date of Patent: Mar. 22, 2016

(54) DATA CACHING POLICY IN MULTIPLE TENANT ENTERPRISE RESOURCE PLANNING SYSTEM

(71) Applicant: Microsoft Corporation, Redmond, WA (US)

(72) Inventors: John Stairs, Copenhagen (DK); Esben Nyhuus Kristoffersen, Copenhagen (DK); Thomas Hejlsberg, Horsholm (DK)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 101 days.

(21) Appl. No.: 14/175,167

(22) Filed: Feb. 7, 2014

(65) Prior Publication Data
US 2015/0095581 A1 Apr. 2, 2015

Related U.S. Application Data

(60) Provisional application No. 61/883,812, filed on Sep. 27, 2013.

(51) Int. Cl.
*G06F 12/08* (2006.01)
*G06F 12/12* (2006.01)

(52) U.S. Cl.
CPC ............ *G06F 12/122* (2013.01); *G06F 12/084* (2013.01); *G06F 12/123* (2013.01); *G06F 12/0866* (2013.01); *G06F 2212/601* (2013.01)

(58) Field of Classification Search
CPC . G06F 12/084; G06F 12/0866; G06F 12/122; G06F 12/123; G06F 2212/601

USPC ......................................................... 711/130
See application file for complete search history.

(56) References Cited

U.S. PATENT DOCUMENTS

| | | | |
|---|---|---|---|
| 5,357,623 A | 10/1994 | Megory-Cohen | |
| 5,394,531 A | 2/1995 | Smith | |
| 6,272,598 B1 | 8/2001 | Arlitt et al. | |
| 6,493,800 B1 | 12/2002 | Blumrich | |
| 2003/0149843 A1* | 8/2003 | Jarvis et al. | 711/133 |
| 2005/0080995 A1* | 4/2005 | Davis et al. | 711/133 |
| 2006/0064545 A1* | 3/2006 | Wintergerst | 711/130 |
| 2006/0143389 A1* | 6/2006 | Kilian et al. | 711/130 |
| 2009/0182836 A1 | 7/2009 | Aviles et al. | |
| 2012/0079206 A1 | 3/2012 | Zhao et al. | |
| 2012/0198148 A1* | 8/2012 | Benhase et al. | 711/113 |
| 2013/0138891 A1 | 5/2013 | Chockler et al. | |

OTHER PUBLICATIONS

Chockler, et al.,"Data Caching as a Cloud Service", In Proceedings of 4th International Workshop on Large Scale Distributed Systems and Middleware, Jul. 28, 2010, 4 pages.

Bjornsson, et al.,"Dynamic Performance Profiling of Cloud Caches", In Proceedings of ACM Symposium on Cloud Computing, Oct. 2, 2013, 15 pages.

(Continued)

*Primary Examiner* — Yong Choe
(74) *Attorney, Agent, or Firm* — Thomas Marquis; Jim Ross; Micky Minhas

(57) ABSTRACT

A cache manager application provides a data caching policy in a multiple tenant enterprise resource planning (ERP) system. The cache manager application manages multiple tenant caches in a single process. The application applies the caching policy. The caching policy optimizes system performance compared to local cache optimization. As a result, tenants with high cache consumption receive a larger portion of caching resources.

19 Claims, 6 Drawing Sheets

(56) References Cited

OTHER PUBLICATIONS

Shue, et al.,"Performance Isolation and Fairness for Multi-Tenant Cloud Storage" In Proceedings of the 10th USENIX Conference on Operating Systems Design and Implementation, Oct. 8, 2012, 14 pages.

"Windows Azure Shared Caching FAQ", Published on: Sep. 1, 2012, Available at: http://msdn.microsoft.com/en-us/library/windowsazure/hh697522.aspx.

Qureshi, et al.,"Utility-Based Cache Partitioning: A Low-Overhead, High-Performance, Runtime Mechanism to Partition Shared Caches", In Proceedings of the 39th Annual IEEE/ACM International Symposium on Microarchitecture, Dec. 9, 2006, 10 pages.

"International Search Report and Written Opinion Received for PCT Patent Application No. PCT/US2014/056859", Mailed Date: Dec. 5, 2014, 10 Pages.

"Second Written Opinion Issued in PCT Application No. PCT/US2014/056859", Mailed Date: Aug. 18, 2015, 6 Pages.

\* cited by examiner

DATA CACHING POLICY IN MULTIPLE TENANT ENTERPRISE RESOURCE PLANNING SYSTEM

RELATED APPLICATIONS

This application claims priority to U.S. Provisional Application Ser. No. 61/883,812 filed on Sep. 27, 2013. The provisional application is hereby incorporated by reference in its entirety.

BACKGROUND

One of the primary functions of an Enterprise Resource Planning (ERP) middle-tier server is reading and writing data from a relational database, which stores business data. Typically, read operations are performed much more frequently than write operations, and often the same data may be read repeatedly. Reading data from a database is frequently a performance bottleneck as data needs to be retrieved from another tier and the query may take some time to be processed by the database.

Substantial performance improvements are realized when caching data in memory of an ERP server after the data has been read from the database. Subsequent reads of the same data are retrievable from the memory rather than accessing the data from the database.

The challenges in implementing or using a cache include how to limit the cache size while maintaining its effectiveness and how to remove or update cached items when the items no longer accurately reflect the data in the database as a result of updates of other changes applied to the data.

A multiple tenant ERP middle-tier server processes data for multiple tenants, which include multiple organizations. The ERP system is capable of achieving greater economy of scale as a hosting entity by sharing computing resources across many tenants. Tenants or security policies may demand that data separation between the tenants be maintained. Furthermore, hardware resources are to be used and allocated with efficiency and fairness in mind so that a responsive system is maintained for all tenants at all times.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing data caching policy in a multiple tenant enterprise resource planning (ERP) system. In some example embodiments, a cache manager application may manage multiple tenant caches in a single process. The cache manager application may apply a caching policy. The caching policy may optimize system performance compared to local cache optimization. As a result, tenants with high cache consumption may receive a larger portion of caching resources.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
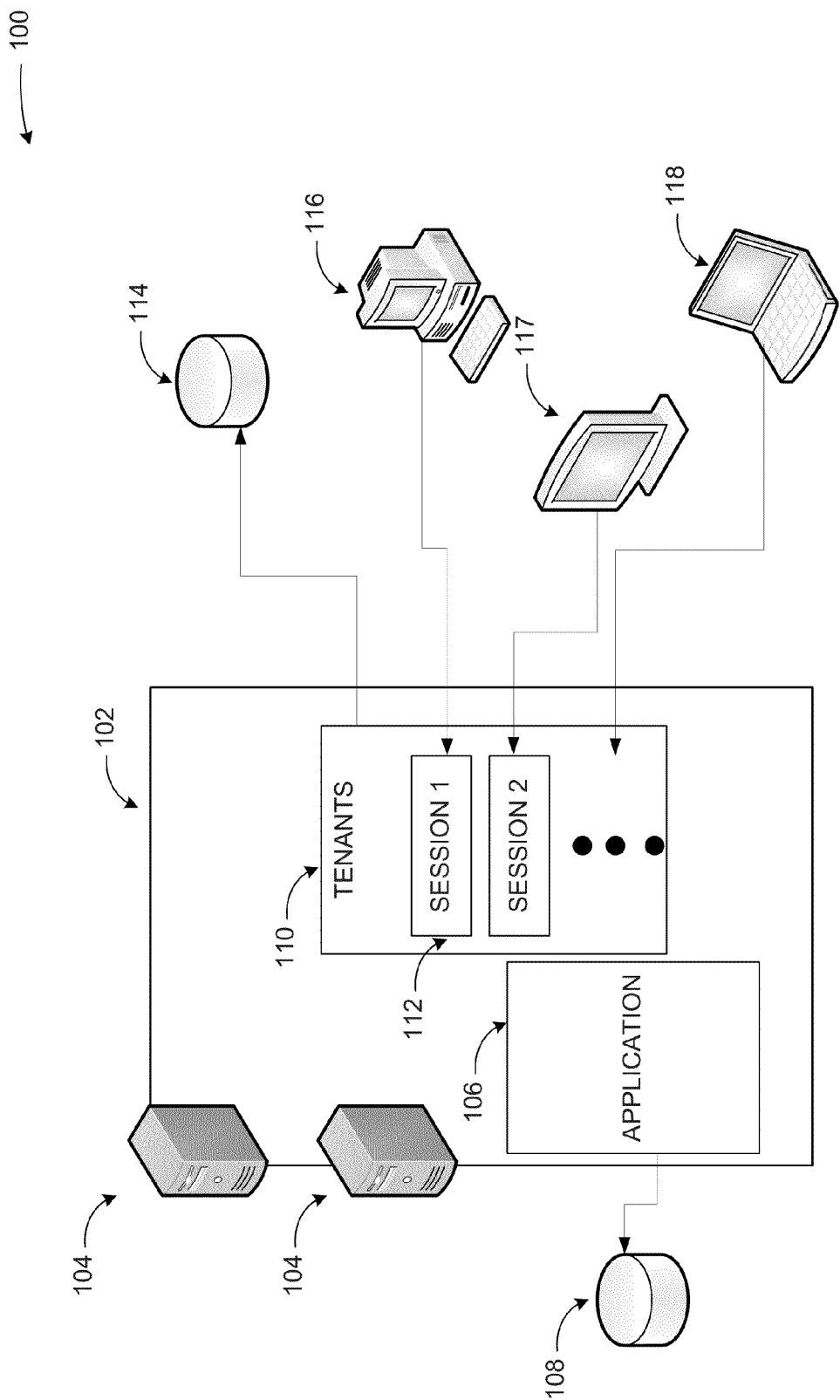
FIG. 1 is a conceptual diagram illustrating an example enterprise resource planning (ERP) system, where a caching policy may be provided in an ERP server according to embodiments.

As briefly described above, a data caching policy may be provided in a multiple tenant enterprise resource planning (ERP) system. A cache manager application may manage multiple tenant caches in a single process. The cache manager application may apply a caching policy. The caching policy may optimize system performance compared to local cache optimization (optimization on individual independent caches).

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide a data caching policy in a multiple tenant ERP system. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example ERP system, where a caching policy may be provided in an ERP server according to embodiments.

As shown in diagram 100, an ERP system 102 may host services provided to tenants 110. The ERP system 102 may provide services to the tenants 110 through physical servers 104 and virtual machines executed in those servers. The ERP system 102 may execute one or more applications 106 on the servers 104 to provide services to the tenants 110. The application 106 may store and retrieve data to and from data store 108. The tenants (there may be one or more tenants) 110 may each have an associated data store 114. Each of the tenants may have its own users who may access the provided services through client applications executed on computing devices 116-118. The client applications may be thick client applications or thin clients such as browsers. The users' access may be managed in sessions 112. The sessions 112 may include handshake protocols, a secure pipeline established through encrypted communications, and similar connection attributes.

The ERP system 102 may host a set of caches for the tenants 110. The set of caches may be managed by a cache manager application providing a data caching policy for managing access to the set of caches for the tenants 110. As the types and sizes of the tenants varies, their needs for system-hosted cache may also vary. For example, some tenants may be small businesses, while others hosted by the same ERP system may be large businesses with relatively larger cache needs.

As mentioned above, functionality of the services provided by the ERP system 102 may be provided by distinct or integrated applications and accessed through client applications on user computers. The client applications may render the functionality of the services of the ERP system 102 while hiding the applications executing on the system servers such as application 106.

While the example system in FIG. 1 has been described with specific components including an ERP system 102 providing services executing a cache manager application providing a data caching policy in the multiple tenant ERP system, embodiments are not limited to these components or system configurations and can be implemented with other system configuration employing fewer or additional components.

Figure 2:
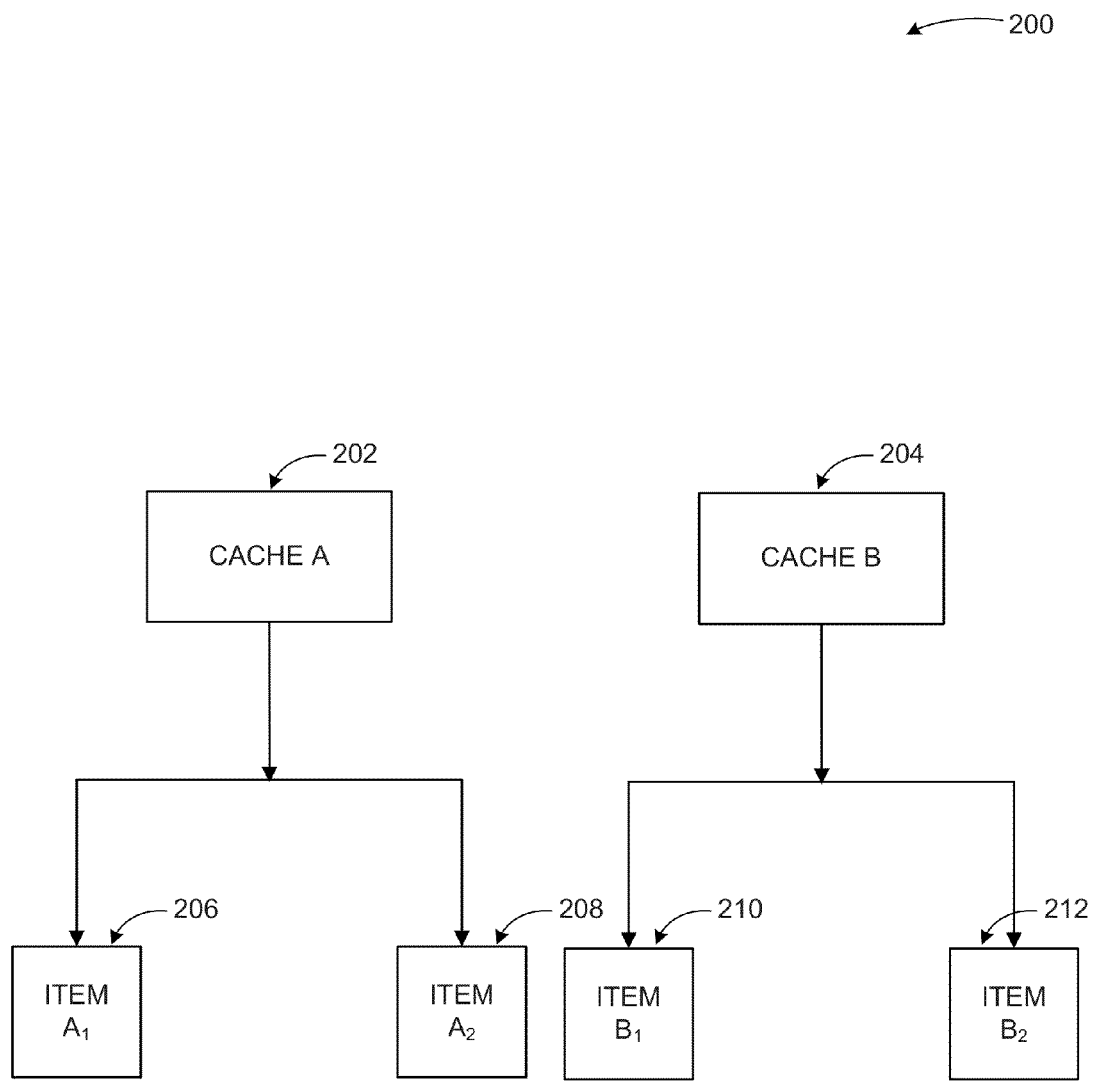
FIG. 2 illustrates an example set of caches, which are independent and unaware of each other.

FIG. 2 illustrates an example set of caches, which are independent and unaware of each other, according to embodiments.

In diagram 200, an example scheme is provided to manage server cache for multiple tenants by maintaining separate caches. In an example scenario, a first tenant may have access to a cache A 202 and a second tenant may have access to a cache B 204. The cache A 202 and the cache B 204 may be unaware of each other as such may not share hardware resources such as available memory. The cache A 202 may include an item A1 206 and an item A2 208 accessed by the first tenant. The cache B 204 may include an item B1 210 an item B2 212 accessed by the second tenant. The second tenant may be unable to access a memory assigned to the cache A 202 in order to store additional items within a scenario such as unavailable space in the cache B 204. Similarly, the first tenant may be unable to access a memory assigned the cache B 204 in order to store additional items within a scenario such as unavailable space in the cache A 202.

Maintenance of separate caches in tenants may also adversely affect determination of maximum size for each cache. In an example scenario, 1 GB of memory may be set aside by the ERP system as data cache for tenants. A predetermined number of tenants (e.g., 1000) may be determined to have access to the data cache. As such, the data cache may be partitioned to 1 MB parts for each tenant. In variety of use scenarios, the determined maximum size of 1 MB for each tenant may be insufficient. Additionally, large sections of the data cache may be underutilized because of offline or idling tenants while active tenants are limited with the 1 MB cache size limitation. A dynamic scheme to determine a maximum size of the cache allocated to tenants may better serve tenants accessing the cache in an uneven process.

In another example scenario, server cache management in multiple tenant environments may include maintenance of a single cache containing data from all tenants. In a single cache scenario, cache operations for each tenant may be expensive. Clearing a cache of data from one tenant may involve enumerating the cache or maintaining additional indices. Moreover, data from different tenants may be stored in the same container, which may increase the risk that a programming error may return data from the wrong tenant.

Embodiments are directed to maintaining multiple isolated data caches. A data cache may be maintained for each tenant. The data caches may be managed by a caching policy. A cache manager application may ensure that the total amount of data stored in all the caches does not exceed a predefined limit. When the amount of data does exceed the limit, the cache manager application may make an intelligent choice for which data to remove from which cache. In an example scenario, data that is least likely to be accessed in a near future by the tenants may be removed from one or more of the caches managed by the cache manager application within the ERP system.

Figure 3:
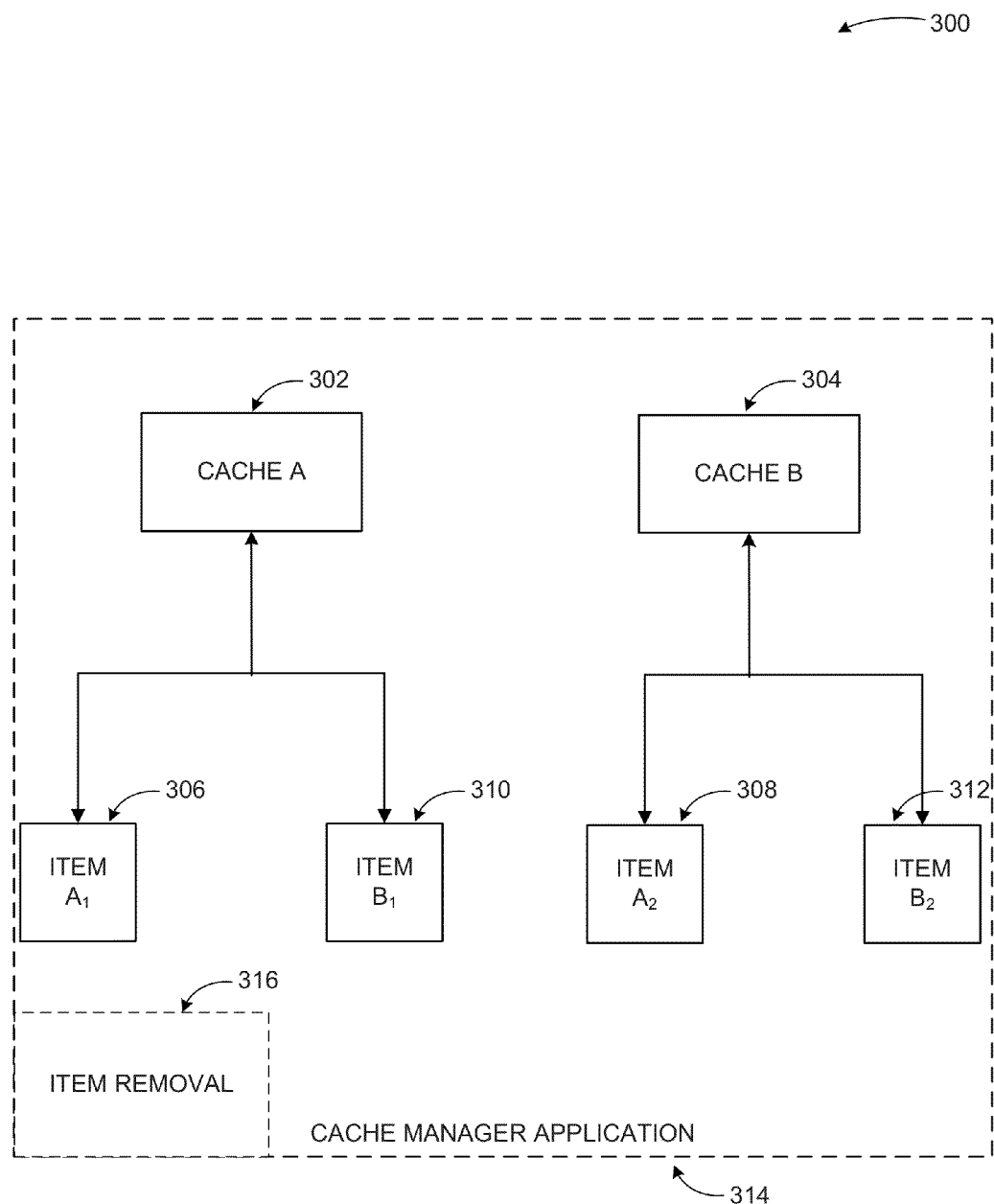
FIG. 3 illustrates an example caching mechanism, where a least recently used (LRU) policy is applied to items across shared caches according to embodiments.

FIG. 3 illustrates an example caching mechanism, where a least recently used (LRU) policy is applied to items across shared caches according to embodiments.

As shown in diagram 300, a cache manager application 314 managing data cache for tenants at an ERP system may recycle old items in the cache through item removal mechanism 316 to allow better utilization of the memory, while maintaining complete separation between the caches. For example, the cache manager application 314 may apply a caching policy such as a least recently used (LRU) policy across the shared data cache. In an example scenario, a cache manager application 314 may determine the caching policy to be a LRU caching policy. A cache 302 and a cache B 304 may be maintained by the cache manager application 314 based on the LRU caching policy. The cache manager application 314 may order items (data) stored in the cache A 302 and the cache B 304 according to a recentness of use by one of the tenants. For example, the item with a timestamp closest to a current time may be ranked a most recently used (MRU) item. In diagram 300, the cache manager application may rank an item B2 312 as the MRU item. An item A2 308 and an item B1 310 may be ranked as near the MRU item by the cache manager application according to their timestamp associated with access to the items. An item A1 306 may be ranked an LRU item by the cache manager application 314 based on its timestamp of access by the tenant associated with cache A 302. The items A1 306 and A2 308 is associated with the cache A 302. The items B1 310 and B2 312 is associated with the cache B 304. A scavenging process may be activated by the cache manager application 314 in response to determining a request for cache resources utilized by the cache A 302 and cache B 304. The cache manager application may remove the LRU item which is the item A1 306 to make available resources dedicated to cache A 302 to other tenants requesting the resources (e.g.: memory utilized by the cache A 302). Additional items may be removed subsequent to removal of item A1 306 based on evaluation of the LRU item, which may be the item B1 310 followed by item A2 308, and so on.

The example implementation of diagram 300 for illustration purposes and is not intended to limit embodiments. Other data caching policies such as Least Frequently Used (LFU) or weighted combinations of different policies may be employed as well. In an LFU caching policy scenario, one or more of the cached items may be determined to be an LFU cached item subsequent to ranking the cached items based on a frequency of access. The LFU cached item may be removed by the cache manager application in response to detecting a total consumed cache memory exceeding a predefined limit. Furthermore, a caching policy may be applied to the cache items from different tenant in a weighted manner.

According to some embodiments, each item in each cache may be registered in the cache manager application. The cache manager application keeps track of the number of cached items and the total amount of memory consumed by the cached items. With this information, the cache manager application may also enforce the caching policy, which is to keep the total memory consumed by the cache below a defined limit, by removing items when necessary.

Items may be ranked from the shared cache based on a variety of data caching policies evaluating attributes including, but not limited to, frequency of access, a last time of an access associated with an item, an expense to re-compute the item, an association with one of the cache, attributes of an associated tenant (e.g., service level agreement), and comparable ones. One or more of the cached items may be removed from a bottom of the ranked cached items.

In some embodiments, a single attribute may be employed for item removal. In other embodiments, a weighted combination of attributes may be employed. The removal may be based on a static or dynamic algorithm, or a heuristic. For example, a machine learning algorithm may adjust the removal strategy to changes over time such as frequency of access by different tenants changing over time. Diagram 300 shows a simple configuration employing LRU strategy for removal of items.

The cache manager application 314 may expose a number of application programming interfaces (APIs) to enable interaction with the shared caches by the applications hosted by the tenants. Example APIs may include, but are not limited to, a RegisterItem operation, which may be parameterized by a cache item that has been added to a cache. A DeregisterItem operation may be parameterized by a cache item that has been removed from one of the caches (e.g., when the cached item has been invalidated). A NotifyItemAccessed operation may be parameterized by a cache item that has just been accessed in a cache through a successful lookup operation (otherwise known as a cache hit).

In response to calls to the RegisterItem operation, the cache policy may be enforced if the total size of cached items exceeds the predetermined limit. Next, one or more items may be selected for removal by the cache manager application 314. The selected item(s) may be deregistered by the cache manager application. Alternatively, the selected item(s) may be removed from the associated cache(s).

The example scenarios and schemas in FIGS. 2 and 3 are shown with specific components, data types, and configurations. Embodiments are not limited to systems according to these example configurations. Providing a data caching policy in a multiple tenant ERP system may be implemented in configurations employing fewer or additional components in applications and user interfaces. Furthermore, the example schema and components shown in FIGS. 2 and 3 and their subcomponents may be implemented in a similar manner with other values using the principles described herein.

Figure 4:
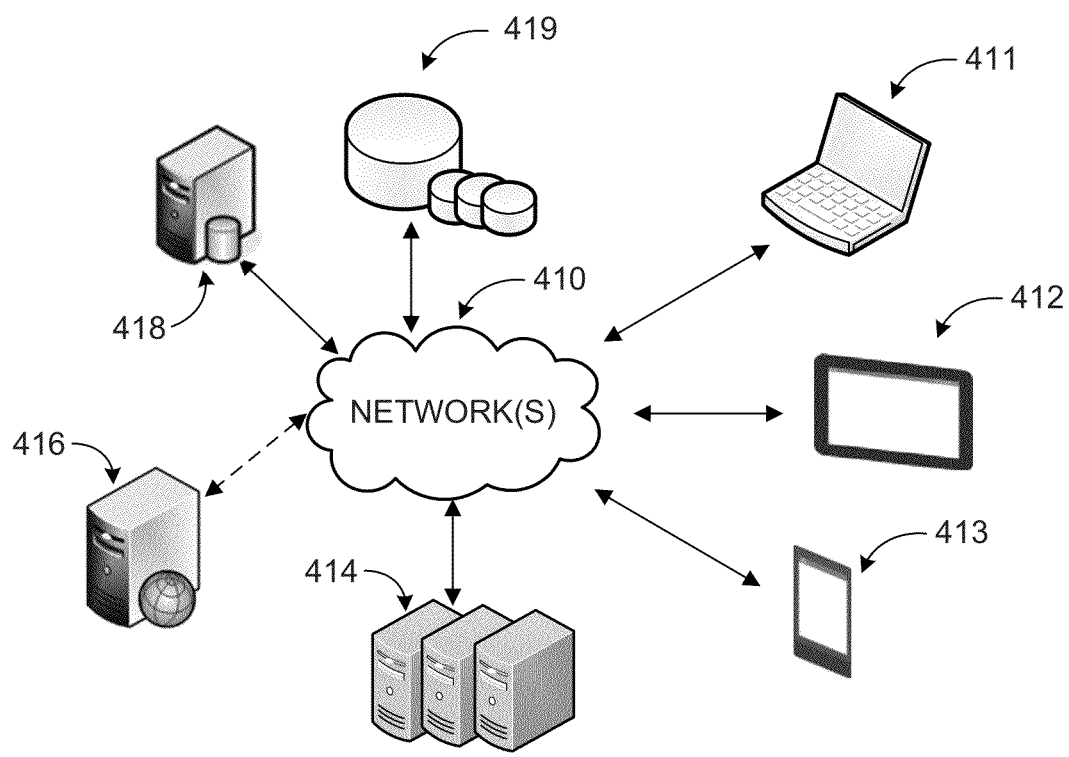
FIG. 4 is a simplified networked environment, where a system according to embodiments may be implemented.

FIG. 4 is an example networked environment, where embodiments may be implemented. A cache manager application for providing a data caching policy in a multiple tenant ERP system may be implemented via software executed over one or more servers 414 such as a hosted service. The platform may communicate with client applications on individual computing devices such as a smart phone 413, a laptop computer 412, or desktop computer 411 ("client devices") through network(s) 410.

Client applications executed on any of the client devices 411-413 may facilitate communications via application(s) executed by servers 414, or on individual server 416. A multiple tenant ERP system may store a portion of data retrieved from database(s) on server memory for fast access. A cache manager application may provide a data caching policy across tenant data in the server memory. The ERP system may store data associated with provided services such as data caching policies in data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide a data caching policy in a multiple tenant ERP system. Furthermore, the networked environments discussed in FIG. 4 are for illustration purposes only. Embodiments are not limited to the example applications, modules, or processes.

Figure 5:
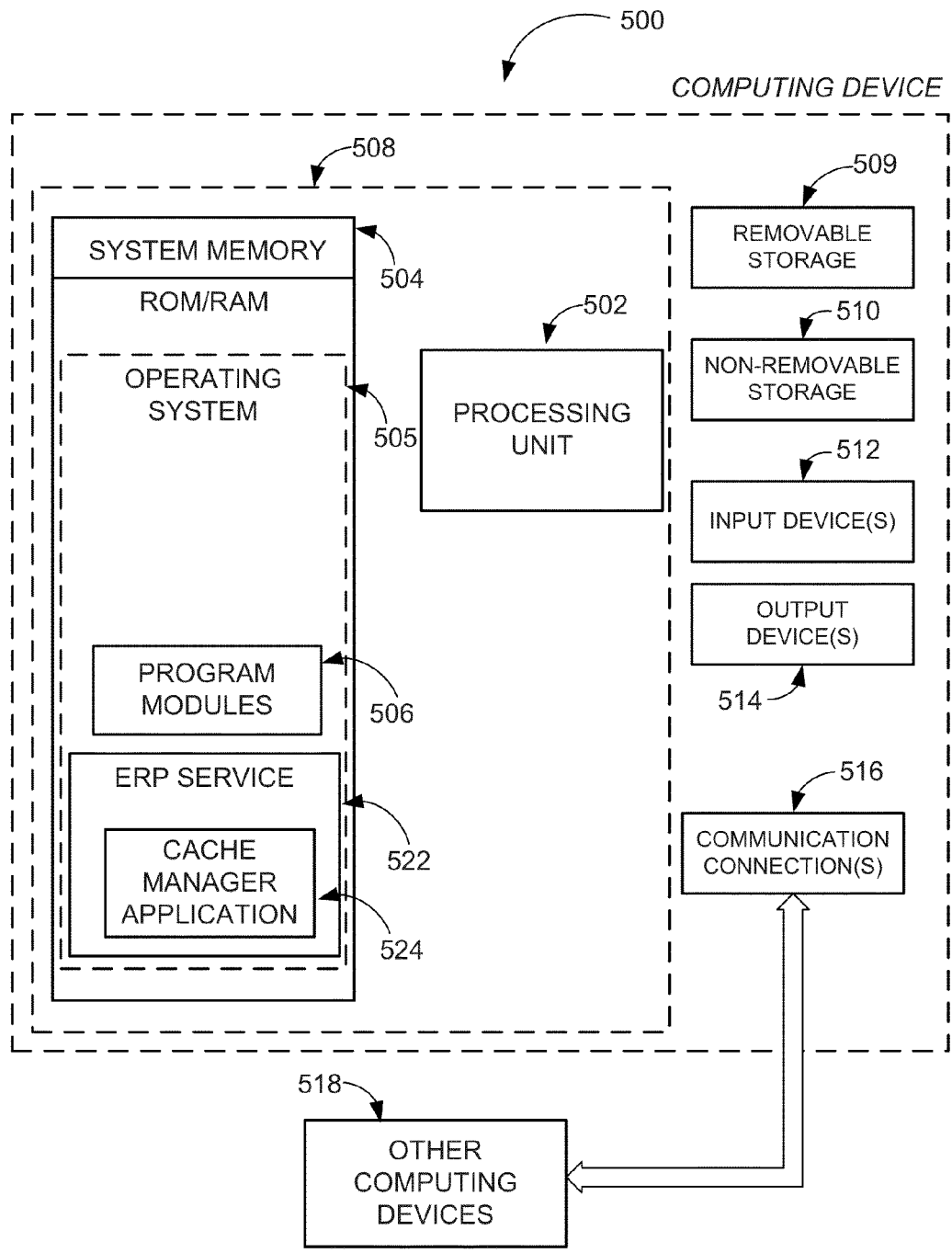
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing one or more applications associated with a hosted ERP system according to embodiments and include at least one processing unit 502 and system memory 504.

Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, ERP service 522, and a cache manager application 524.

The ERP service 522 may cache a portion of data retrieved from one or more databases for the tenants at server memory for fast access. The cache manager application 524 may provide a data caching policy in one or more servers of an ERP system. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, an optical capture device for detecting gestures, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
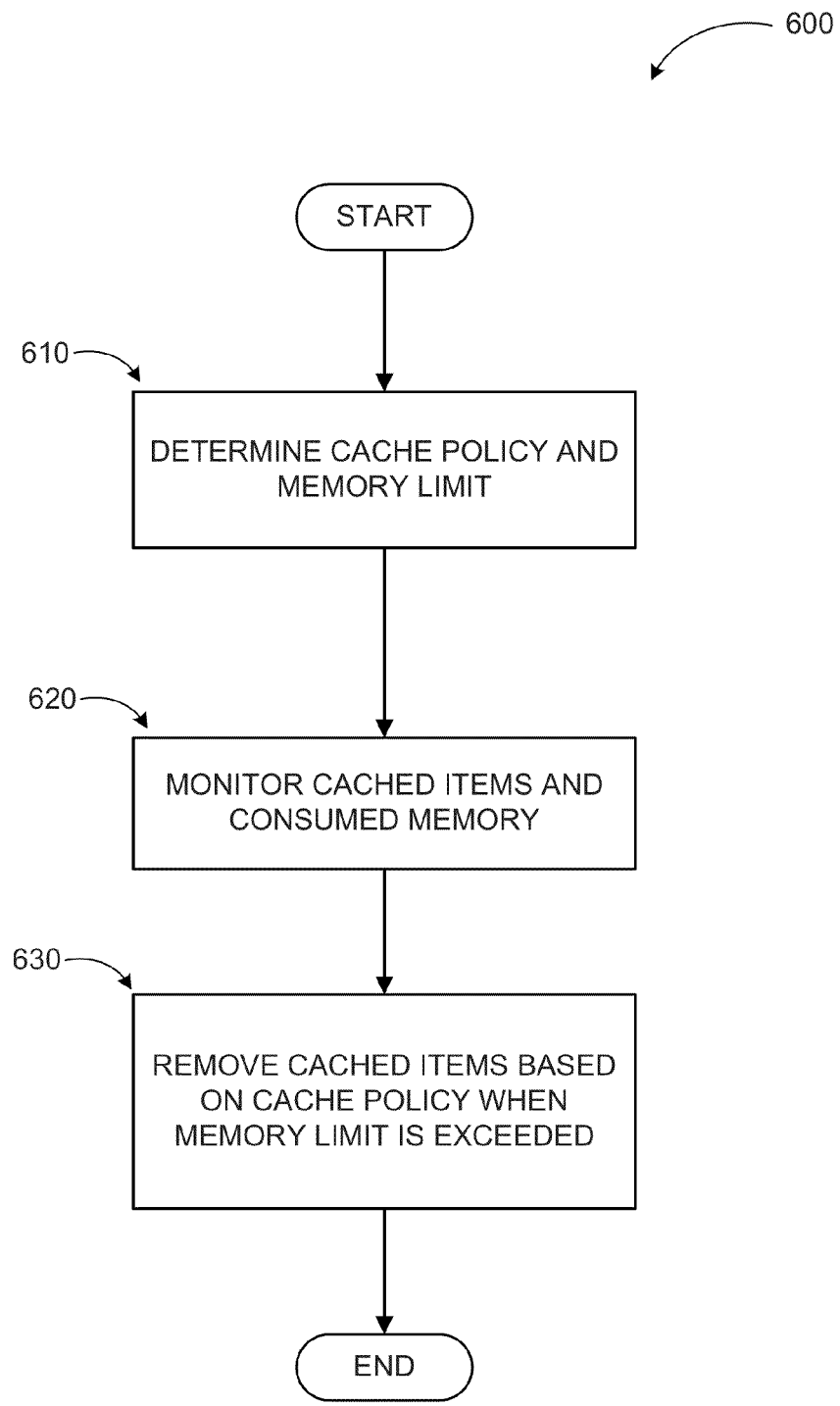
FIG. 6 illustrates a logic flow diagram for a process to provide a data caching policy in a multiple tenant ERP system according to embodiments.

FIG. 6 illustrates a logic flow diagram for a process to provide a data caching policy in a multiple tenant ERP system according to embodiments. Process 600 may be implemented on a hosted ERP system.

Process 600 begins with operation 610, where a cache policy may be received by a cache manager application from a management server, an application database server, or an administrator. The cache manager application may also periodically retrieve the cache policy to ensure updates to the policy are implemented. At operation 620, the cache manager may monitor cached items and the total consumed memory to determine whether any cached items need to be removed in order to maintain the total consumed memory below its predefined (physical or otherwise defined) limit. At operation 630, cached items may be removed from the cache upon determination of the limit being approached or exceeded based on the cache policy. The cache policy may be based on a single attribute or a combination of attributes.

The operations included in process 600 are for illustration purposes. An ERP system according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide a data caching policy in a server of a multiple tenant Enterprise Resource Planning (ERP) system, the method comprising:
    receiving the data caching policy associated with a removal of cached items from a shared cache of the server;
    monitoring status of the cached items and a total consumed cache memory;
    ranking the cached items based on the data caching policy evaluating attributes associated with the cached items including a frequency of an access, a last time of an access, and one or more of: an expense to re-compute, an association with one of the shared cache, and attributes of an associated tenant; and
    in response to detecting the total consumed cache memory exceeding a predefined limit, removing one or more of the cached items from the shared cache based on the data caching policy.

2. The method of claim 1, further comprising:
    ordering the cached items based on access associated with each of the cached items based on a determination of a least recently used (LRU) caching policy as the data caching policy.

3. The method of claim 2, further comprising:
ranking one of the cached items with a timestamp furthest from a current time as a LRU cached item.

4. The method of claim 3, further comprising:
removing the LRU cached item in response to detecting the total consumed cache memory exceeding the predefined limit.

5. The method of claim 2, further comprising:
ranking one of the cached items with a timestamp nearest to a current time as a most recently used (MRU) cached item.

6. The method of claim 1, further comprising:
ordering the cached items based on a frequency of access associated with each of the cached items based on a determination of a least frequently used (LFU) caching policy as the data caching policy.

7. The method of claim 6, further comprising:
ranking one of the cached items as a LFU cached item, wherein the LFU cached item has a lowest frequency of use compared to other cached items.

8. The method of claim 7, further comprising:
removing the LFU cached item in response to detecting the total consumed cache memory exceeding the predefined limit.

9. The method of claim 1, further comprising:
removing the one or more cached items from a bottom of the ranked cached items.

10. A server to provide a data caching policy in a multiple tenant Enterprise Resource Planning (ERP) system, the server comprising:
a memory;
a processor coupled to the memory, the processor executing a cache manager application in conjunction with instructions stored in the memory, wherein the cache manager application is configured to:
receive the data caching policy associated with removal of cached items from a shared cache of the server;
monitor status of the cached items and a total consumed cache memory;
rank the cached items based on the data caching policy evaluating attributes associated with the cached items including a frequency of an access, a last time of an access, and one or more of: an expense to re-compute, an association with one of the shared cache, and attributes of an associated tenant; and
in response to detecting the total consumed cache memory exceeding a predefined limit, remove one or more cached items from the shared cache based on the data caching policy.

11. The server of claim 10, wherein the cache manager application is further configured to:
provide an application programming interface (API) to enable tenants to interact with the shared cache through a registration operation.

12. The server of claim 11, wherein the cache manager is further configured to:
parameterize the registration operation by one of the cached items that has been added to the shared cache.

13. The server of claim 10, wherein the cache manager application is further configured to:
provide an application programming interface (API) to enable tenants to interact with the shared cache through a de-registration operation.

14. The server of claim 13, wherein the cache manager application is further configured to:
parameterize the de-registration operation by one of the cached items that has been removed from the shared cache.

15. The server of claim 10, wherein the cache manager application is further configured to:
provide an application programming interface (API) to enable tenants to interact with the shared cache through an accessed item notification operation.

16. The server of claim 15, wherein the cache manager application is further configured to:
parameterize the accessed item notification operation by one of the cached items that has been accessed within the shared cache through a lookup operation.

17. A method executed on a computing device to provide a data caching policy in a server of a multiple tenant Enterprise Resource Planning (ERP) system, the method comprising:
receiving the data caching policy associated with removal of cached items from a shared cache of the server;
monitoring status of the cached items and a total consumed cache memory;
ranking the cached items based on the data caching policy evaluating attributes associated with the cached items including a frequency of an access, a last time of an access, and one or more of: an expense to re-compute, an association with one of the shared cache, and attributes of an associated tenant; and
in response to detecting the total consumed cache memory exceeding a predefined limit, removing one or more cached items from the shared cache based on the data caching policy.

18. The method of claim 17, further comprising:
ordering the cached items based on a timestamp of access associated with each of the cached items based on a determination of a least recently used (LRU) caching policy as the data caching policy;
ranking one of the cached items with a timestamp furthest from a current time as a LRU cached item; and
removing the LRU cached item in response to detecting the total consumed cache memory exceeding the predefined limit.

19. The method of claim 17, further comprising:
ordering the cached items based on a frequency of access associated with each of the cached items based on a determination of a least frequency used (LFU) caching policy as the data caching policy;
ranking one of the cached items as a LFU cached item, wherein the LFU cached item has a lowest frequency of use compared to other cached items; and
removing the LFU cached item in response to detecting the total consumed cache memory exceeding the predefined limit.

* * * * *